April 28, 1970     D. K. AHERN     3,508,299
AUTOMATIC DEGATING OF INJECTION MOLDED ARTICLES
Filed May 24, 1967     2 Sheets-Sheet 1
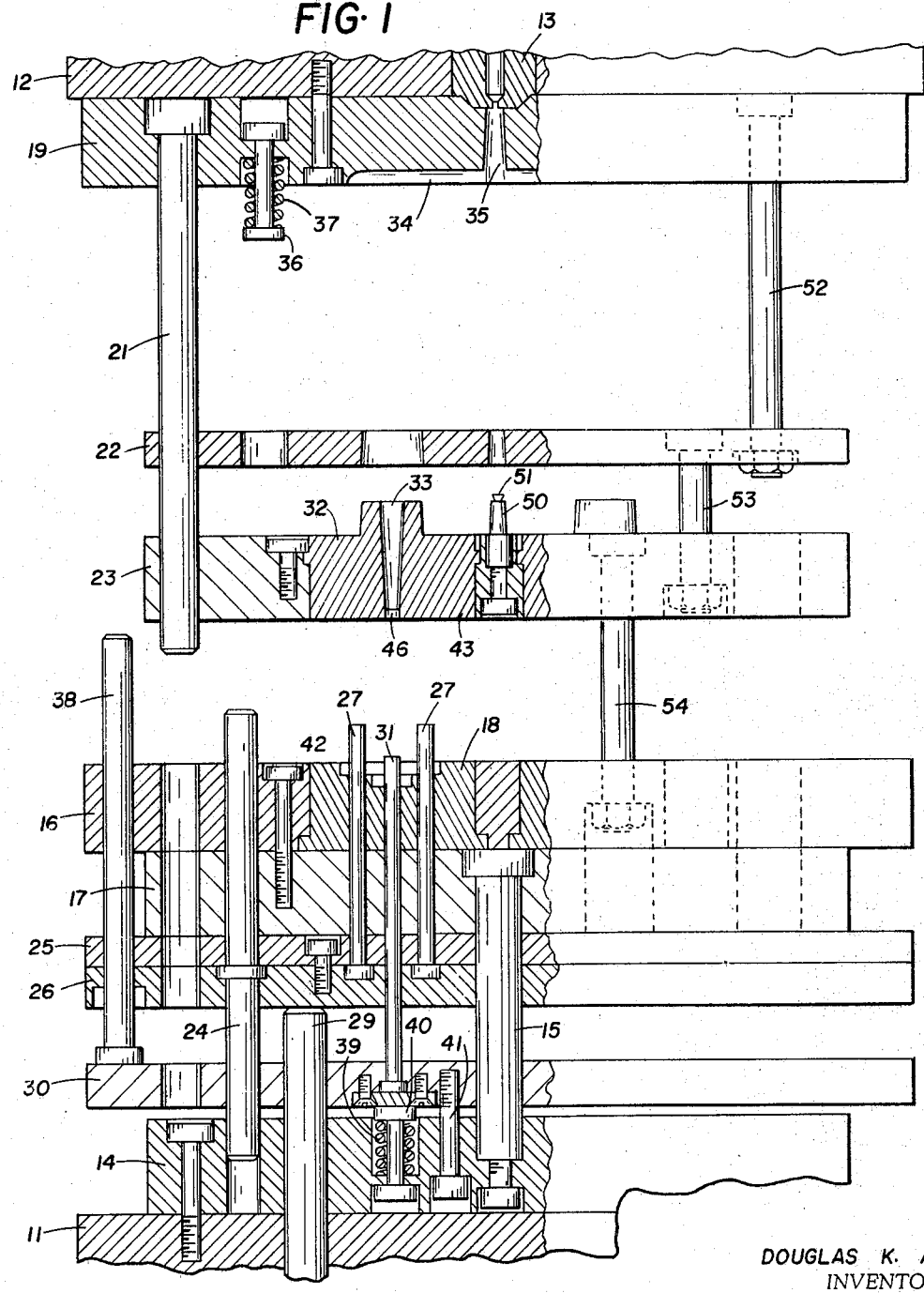
DOUGLAS K. AHERN
INVENTOR.
BY
ATTORNEYS April 28, 1970  D. K. AHERN  3,508,299
AUTOMATIC DEGATING OF INJECTION MOLDED ARTICLES
Filed May 24, 1967  2 Sheets-Sheet 2
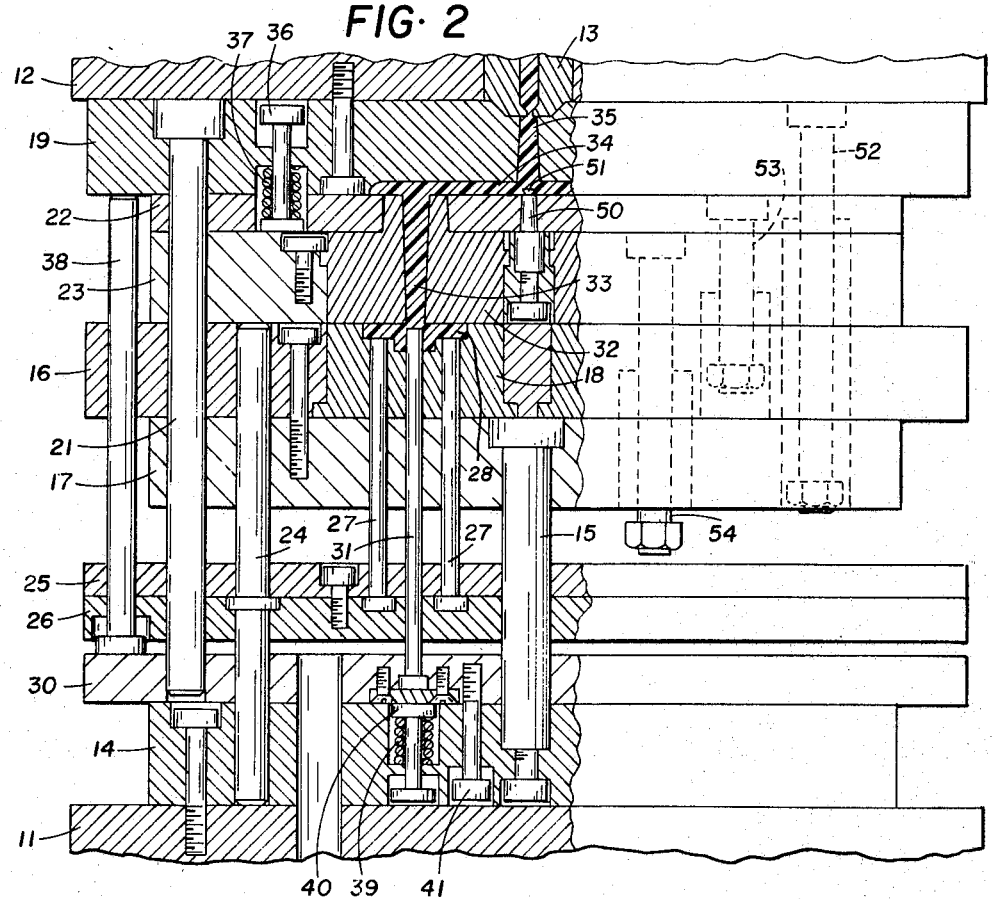
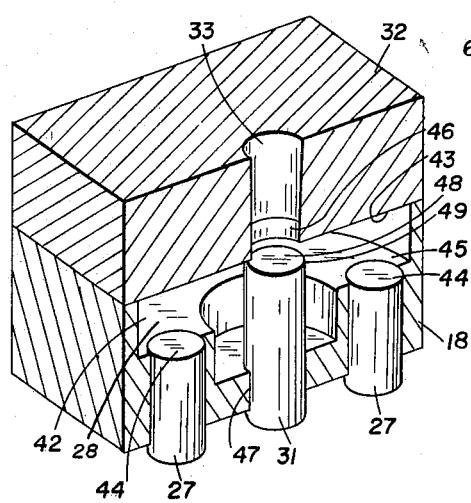
DOUGLAS K. AHERN
INVENTOR.
BY *James A. Smith*
*Robert W. Hampton*
ATTORNEYS United States Patent Office 3,508,299
Patented Apr. 28, 1970

3,508,299
AUTOMATIC DEGATING OF INJECTION
MOLDED ARTICLES
Douglas K. Ahern, Rochester, N.Y., assignor to Eastman
Kodak Company, Rochester, N.Y., a corporation of
New Jersey
Filed May 24, 1967, Ser. No. 640,932
Int. Cl. B29f 1/05
U.S. Cl. 18—30
5 Claims

ABSTRACT OF THE DISCLOSURE

An injection mold assembly is provided with an axially movable degating pin which extends part way through a mold cavity and is aligned with a mating sprue channel. Molding material injected into the sprue channel enters the mold cavity through a gate formed between the pin and sprue channel. After the cavity has been filed, the assembly end plates separate causing relative movement of the mold cavity and the degating pin thereby moving the pin through the mold cavity to a position in which it extends partially into the sprue opening. This movement causes separation of the sprue from the molded article by shearing of the material in the gate area.

This invention relates to degating injection molded articles and more particularly to automatically degating an article formed by diaphragm or semi-diaphragm gating means, such degating being accomplished during the operation of the molding apparatus and before the article is removed from the mold cavity in which it is formed.

In molding articles by so-called diaphragm or semi-diaphragm gating means, a fluid molding material is injected into a sprue channel from which it enters a mold cavity in radial directions from the sprue channel through a narrow perimetric diaphragm gate channel or through one or more partially perimetric semi-diaphrgam gate channels. The advantages of such gating techniques are well known, the most important being more complete filling of the mold cavity, elimination of knit lines and reduction in nonuniform shrinkage of the molded article by minimizing variations in the density of the molded material throughout the article.

While it is known to automatically degate molded articles formed by conventional lateral gating techniques by incorporating a movable degating blade or the like in perpendicular relation to the parting line of a mold cavity laterally thereof, the optimum location of a diaphragm or semi-diaphragm gate relative to the mold cavity often precludes the use of analogous degating devices, e.g. in a mold in which the sprue opening is perpendicular to the parting line near the center of the mold cavity. Therefore, articles formed in such molds have generally required the performance of secondary degating operations after removal from the molding machine to separate the article itself from the extraneous material comprising the gate, sprue, runners, etc.

According to the present invention, this degating operation is performed automatically during the molding cycle by simple and reliable means comprising a degating member including an end portion adapted to be moved through the gate area and into the mating sprue opening after the cavity has been filled, to shear the gate material before the molded part has been ejected from the mold. This arrangement is particularly appropriate for use in a mold assembly adapted to produce an article having a functional hole extending therethrough along the direction in which the mold is opened and which can be gated effectively near one end of the hole, in which case the core pin extending into the cavity to define the hole is aligned with the sprue opening to establish the gating area and also serves as the degating member by being movable into mating relation with the opening; or for use in a mold in which a nonfunctional hole can be produced in the molded article in a similar manner without detracting from the utility of the finished article.

Various means for accomplishing the invention and other advantages and features thereof will be apparent from the following detailed description of a molding apparatus adapted to produce an article of the type mentioned in the foregoing paragraph, reference being made to the accompanying drawings in which like reference numerals refer to like elements and in which:

FIG. 1 is a front elevational view, partially in cross section, of an open multiple cavity mold assembly according to a preferred embodiment of the invention, with various duplicated elements of the assembly being shown only once for purposes of clarity;

FIG. 2 corresponds to FIG. 1 and illustrates the depicted mold assembly in closed condition following the injection of molding material into the mold cavities but before the degating operation has been performed;

FIG. 3 is an enlarged cross sectional perspective view of a portion of the assembly shown in FIGS. 1 and 2, illustrating the relation of the various elements defining a mold cavity when the mold assembly is in closed condition prior to the injection operation;

FIG. 4 is an enlarged cross sectional view corresponding generally to FIG. 3 but showing an alternate embodiment of the combined core pin and degating member and of the means employed to eject the finished article from the mold cavity; and FIG. 5 is a top plan view of the combined core pin and degating member shown in FIG. 4.

As shown in FIGS. 1 and 2, the subject mold assembly is of generally conventional overall construction, comprising a series of stationary and movable plates supported in parallel relation between the movable platen 11 and the fixed platen 12 of an injection molding machine including means for injecting fluent molding material into the mold assembly through a nozzle member 13. As is customary in such apparatus, the various rods, bolts and the like employed to support and move the mold plates are symmetrically duplicated in the mold assembly, as are the elements comprising each of the multiple mold cavities and the ejecting and degating elements associated therewith. Accordingly, in the interest of clarity, only one of each of such duplicated elements has been illustrated. Therefore, when such elements are referred to in a plural sense, it should be understood that the corresponding illustrated element represents a plurality of such elements disposed in generally symmetrical relation to the mold assembly.

The lower end plate 14 of the mold assembly is bolted to the movable machine platen 11 and supports a centrally located pedestal rod 15, the upper end of which is clamped between permanently abutting plates 16 and 17 to maintain lower mold die member 18 in fixed relation to the movable machine platen. The upper end plate 19 is similarly bolted to the fixed platen 12 and supports slide rods 21, which project through all of the plates between the end plates when the mold assembly is closed as shown in FIG. 2 and serve to support sprue extractor plate 22 and upper die plate 23 in the respective positions shown in FIG. 1 when the mold is in its opened condition.

Slide pins 24 are slidably supported at their opposite ends in mating holes in lower end plate 14 and in plate 17 to movably support ejector plates 25 and 26, which are bolted together to clamp the ejector plates to the slide pins and to anchor ejector pins 27 to the ejector plates with the latter pins extending through corresponding openings in plate 17 and die members 18 in alignment with mold cavities 28 defined by the die members. When the mold assembly is fully opened as shown in FIG. 1, plates 25 and 26 are positioned adjacent plate 17 by ejector rods 29, which are immovably supported on a stationary portion of the molding machine in alignment with corresponding holes in the movable platen and in the two lowermost plates of the mold assembly. A degating pin support plate 30 is also slidably mounted along slide pins 24 adjacent lower end plate 14 of the mold assembly and serves to support degating core pins 31 extending into the mold cavities through aligned openings in the lower die members and in plates 17, 25, and 26.

When the movable machine platen 11 is raised to the position shown in FIG. 2, the sprue extractor plate 22 and the upper die plate 23 are sandwiched tightly between upper end plate 19 and lower die plate 16 to maintain the upper die members 32 in the upper die plate in firm engagement with the corresponding lower die members. With the upper and lower die members so retained in cooperating relation with one another, the closed molding cavities 28 defined thereby communicate with nozzle 13 through gating sprue channels 33 in the upper die members and through runner channels 34 and nozzle sprue channel 35 in upper end plate 19. As the above-mentioned plates are moved into such tightly sandwiched relation to one another, spring loaded plungers 36 in the upper end plate are engaged by the upper die plate and are raised upwardly against the resistance of their relatively strong compression springs 37. Similarly, the closing of the mold assembly also causes the upper end plate to be engaged by the upper ends of spacer pins 38, which are slidably supported in plates 16, 25, and 26 and abut against degating pin support plate 30. Thus, plate 30 is positioned in predetermined relation to the die members, whereupon further movement of the movable platen forces the lower end plate into adjacency with plate 30 by overcoming the relatively strong resilient force of compression springs 39, which are associated with plungers 40 to resiliently urge plates 14 and 30 into spaced relation as defined by stop bolts 41. Additionally, as the movable platen moves into the closed mold position, slide pins 24 engage the upper die plate 23 and are axially positioned between that plate and the movable platen to locate ejector pin support plates 25 and 26 in accurately predetermined relation to the die members.

FIG. 3 shows one of the mold cavities defined by a mating pair of die members when the mold assembly has been completely closed, at which time the ejector pins 27 and the degating core pins 31 are axially positioned in precise predetermined relation to the die members in accordance with the above-described positioning of the respective pin support plates. For illustrative purposes, the depicted lower die member 18 defines a stepped cylindrical recess 42 which is closed by the flat lower surface 43 of the upper die member 32 to define cavity 28 adapted to produce a flanged hub with a central hole therein, but it should be apparent that many other types of articles could also be produced in accordance with the invention.

The end surfaces of ejector pins 27 are shown at 44 in flush relation to internal flange surface 45 of the mold cavity and do not alter the conformation of the molded article. Gating sprue channel 33 enters the cavity through the upper die member and is tapered throughout most of its length but cylindrical at its lower end, which defines sprue opening 46 at the center of surface 43. The degating core pin 31 is received through mating hole 47 in the lower die member in perfect axial alignment with gating sprue opening 46 and with its upper end surface 48 spaced slightly below that opening, such spacing being exaggerated in the illustration for purposes of clarity. Accordingly, when fluid molding material such as molten thermoplastic resin is injected into sprue channel 35, it enters the mold cavity laterally in all directions through the thin annular diaphragm gate defined between the sharp peripheral shearing edge 49 of the pin and the adjacent surface of the upper die member surrounding the sprue opening. Since the degating core pin extends into the mold cavity, it is apparent that the pin serves not only to define the diaphragm gate but also to provide a cylindrical hole in the molded article, extending almost completely therethrough.

After the injection operation has been completed and the injected material has solidified, the lower platen is moved downwardly to open the mold assembly. As such movement of the platen commences, the lower die plates 16 and 17 move away from the upper fixed platen 12 but the upper die plate remains in tight contact with plate 16 to maintain the die members in closed relation due to the influence of spring loaded plungers 36. During this stage of movement, the sprue extractor plate also remains against plate 23 as the nozzle sprue and runner material are pulled out of the corresponding channels in upper end plate 19 by extractor pin 50, the upper end portion 51 of which is embedded in the solidified nozzle sprue material. Simultaneously, the spring loaded plungers 40 urge the degating pin support plate away from the lower end plate by sliding spacer rods 38 upwardly relatively to the lower die member. Thus, the degating core pins are moved forcefully into the aligned mating cylindrical portions of the gating sprue channels by a distance determined by stop bolts 41, whereby the sharp shearing edges 49 of the pins shear the diaphragm gate material to completely separate the molded article from the superfluous sprus and runner material. As the degating core pins perform this function by moving from retracted positions to extended positions, it will be seen that the separation between plates 19 and 22 allows the gating sprue material to be forced partially out of the gating sprue channels ahead of the degating pins by flexing the runner material, regardless of the adherence of that material to the extractor pin.

During the continuing downward movement of the movable platen, draw bolts 52, 53, and 54 move the sprue extractor plate and the upper die plate to the respective positions shown in FIG. 1 as is well known in the molding art, whereby the sprue extractor plate dislodges the sprue and runner material from the extractor pin so that this material can be readily removed from the mold assembly. Concurrently, as the movable plate approaches its extreme lower position, ejector rod 29 is received through plates 14 and 30 to block downward movement of the ejector pin support plates 25 and 26. Thereafter, further movement of the lower die plates causes the molded articles therein to be ejected from the respective lower die members and stripped off the degating core pins by the ejector pins, so that the finished articles may be removed from the mold assembly by air jets or other known means to clear the mold assembly for initiation of a subsequent molding cycle.

Although the foregoing description of the operation of the illustrated apparatus involves degating the molded articles during the initial phase of a continuous mold opening movement of the movable platen, it should be apparent that the degating operation is completed while the mold cavities are still tightly closed. Therefore, rather than waiting until the molded article is solidified before initiating the mold opening operation, the movable platen could be moved just far enough to cause the degating pins to enter the corresponding sprue openings to degate the articles before the molding material solidifies, whereupon further movement of the platen could be delayed until the articles were sufficiently rigid to be ejected from the cavities. Since the degating pins thus would not be required to shear through solidified material, this technique might be particularly advantageous if the degating pins were necessarily of relatively weak configuration or if the invention were employed in molding a particularly strong and shear resistant material. Similarly, and regardless of the timing of the degating operation during the molding cycle, it should also be apparent that positive displacement means such as hydraulic cylinders or the like could be substituted for the illustrated spring loaded plungers to effect the degating operation, thereby positively maintaining the cooperating die members in tight engagement during that operation.

Since the degating core pins must mate very closely with the corresponding gating sprue openings to provide clean flash-free shearing of the gate material, the cooperating die members must obviously be aligned with one another with a correspondingly high degree of accuracy to insure exact coaxial alignment between the degating pins and the corresponding sprue openings. While this requirement can be achieved by precision machining techniques including very accurate fitting of the slide rods in the mating holes in the die plates and perhaps by the use of additional guide pins and holes, not shown, in the die members themselves, the very close tolerances involved may in some cases be prohibitive or may limit the effective life of the mold assembly. Furthermore, if the unsupported portions of the degating pins within the mold cavities are long and thin, and hence correspondingly flexible, the pins may be distorted out of perfect alignment with the sprue openings by experiencing lateral pressure influences and unequal temperature conditions when the molding material is injected into the cavities.

To minimize these problems, an alternate embodiment of the invention contemplates the use of degating pins which are supported at their rounded or chamfered free ends in the sprue openings with channels being formed along the supported portions of the pins to prevent the pins from completely obstructing the openings. Beyond these channels, the pins are of the same cross sectional configuration as the openings, so that movement of the latter portions of the pins into the openings causes the gate to be sheared.

As an illustration of this embodiment of the invention, FIG. 4 shows portions of a pair of cooperating upper and lower die members 55 and 56, similar to the respective previously described die members 32 and 18, and adapted to produce a similar type of molded article in mold cavity 57. The illustrated degating core pin 58 extends upwardly into the mold cavity through a slidable tubular ejector member 59, which is not essential to this particular embodiment but merely illustrates an alternate type of ejector member which could be substituted for the formerly described ejector pins. At its upper end, the degating pin is rounded or chamfered as shown at 61 so that the pin tends to guide itself into the cylindrical opening 62 of the gating sprue channel 63 and to align the die members as they are moved into closed relation to one another. Along the portion of the pin received in the sprue opening, its cylindrical peripheral surface is interruped by three flat surfaces 64, shown in top view in FIG. 5, which terminate at coplanar shoulders 65 defining shearing edges 66 located slightly below the adjacent sprue opening. Thus, the sprue channel communicates with the mold cavity through the three channels defined between the flat surfaces of the pin and the adjacent internal surfaces of the cylindrical portion of the sprue channel, so that the molding material enters the cavity through a semi-diaphragm gate comprising three symmetrically disposed channels defined between the upper die member and the pin shoulders 65. After the cavity has been filled, the pin is moved upwardly relative to the die members by the same type of mechanism previously described, to a position in which the cylindrical portion of the pin below the shearing edges extends slightly into the sprue opening, thereby causing those edges to shear the semi-diaphragm gate material.

Although the foregoing disclosure relates to degating a molded article formed by diaphragm or semi-diaphragm gating means located centrally of the mold cavity, it should be understood that the same invention concepts could also be applied to degating articles produced by other gating techniques, including those in which the molding material enters a mold cavity in lateral relation thereto. Accordingly, since these and other variations and modifications of the above-described specific embodiments of the invention can be effected within the spirit and scope of the invention, the present disclosure is to be considered as illustrative and not as limiting the scope of the invention which is defined by the following claims.

I claim:

1. A mold assembly for use in an injection molding machine, said assembly including:
    (a) relatively movable die means including first and second die members, said die means being adapted when closed to define a mold cavity and when open to allow removal of a molded article produced in said cavity;
    (b) means coupled with said die means for moving said die means when closed from a molding position to a degating position;
    (c) means defining a sprue channel extending through said first die member;
    (d) a degating member supported by said second die member for movement between a retracted position and an extended position while said die means are closed;
    (e) gating means defining a gating channel affording lateral communication between said sprue channel and said mold cavity when said degating member is in said retracted position;
    (f) surface means defining on said degating member a shearing edge positioned beyond said gating channel when said degating member is in said retracted position, said shearing edge being adapted to traverse said gating channel and to mate with said sprue channel when said degating member is moved to said extended position while said die means are closed; and
    (g) means responsive to movement of said die means to said degating position for moving said degating member from said retracted position to said extended position after said cavity has been filled with molding materials through said channels, whereby said shearing edge shears the molding material in said gating channel.

2. A mold assembly adapted for use in a molding machine including means for injecting molding material into a closed mold cavity defined by said mold assembly to form a molded article therein, said mold assembly comprising:
    (a) first and second die members supported for relative movement along a straight movement path between first and second closed positions and open positions, said die members cooperating to define a closed mold cavity when in said first and second closed positions and wherein an article formed in said closed cavity is removable from said mold assembly when said die members are in said open positions;
    (b) means defining a sprue channel aligned with and extending from said cavity through said first die member along an axis parallel to said path of movement;
    (c) a degating member supported by said second die member in coaxial alignment with said sprue channel in said first die member and including shearing edge means adapted to mate with the portion of said sprue channel adjacent said cavity, said degating member being axially movable from
        (1) a first position in which said shearing edge means are spaced axially from said sprue channel to define a gating channel laterally connecting said sprue channel with said closed mold cavity, to (2) a second position in which said shearing edge means are received in mating relation within said portion of said sprue channel; and (d) means responsive to movement of said die members to said second closed position for automatically effecting movement of said degating member from said first position to said second position, after molding material has been injected into said sprue channel, said gating channel and said closed mold cavity whereby said shearing edge means traverse said gating channel by shearing the molding material therein.

3. A mold assembly adapted for use in an injection molding machine, said assembly including:

(a) die means, supported for relative movement along a straight line path, said die means being adapted when closed to define a mold cavity and when open to allow removal of a molded article produced in said cavity;

(b) first and second end support plates at opposite ends of said mold assembly movable relative to each other along said movement path to predetermined open and closed locations;

(c) means defining a sprue channel extending from said mold cavity through said die means along an axis parallel to said movement path and extending into said first end support plates;

(d) a degating member support plate movable along said movement path between said die means and said second end support plates;

(e) a degating member attached to said degating member support plate and supported thereby in coaxial alignment with said sprue channel and including shearing edge means adapted to mate with the portion of said sprue channel adjacent said cavity, said degating member being axially movable from (1) a first position in which said shearing edge means are spaced axially from said sprue channel to define a gating channel laterally connecting said sprue channel with said closed mold cavity, to (2) a second position in which said shearing edge means are received in mating relation within said portion of said sprue channel;

(f) means coupling said die means to said end support plates to (1) close said die means in response to movement of said end support plates to said closed locations and (2) open said die means in response to movement of said end support plates to said open locations; and (g) means coupling said degating member support plate with said end support plates to move said degating member attached to said degating member support plate from said first position to said second position in response to the initial movement of said end support plates from said closed locations toward said open locations before such movement of said end support plates effects opening of said die means.

4. A mold comprising:

(a) first and second die member movable relative to one another along a straight movement path to open and close a mold cavity defined by said die members, said die members being movable together from a molding to a degating position along said straight movement path when closed;

(b) means defining a mold surface on said first die member in transverse relation to said path of movement;

(c) means defining a sprue channel extending from said mold surface through said first die member along an axis parallel to said path of movement and in generally central relation to said mold cavity, said sprue channel including a cylindrical portion adjacent said mold surface;

(d) a degating core pin supported by said second die member in coaxial alignment with said sprue channel, said degating core pin including a cylindrical section conforming to the cylindrical portion of said sprue channel; and (e) means responsive to movement of said die members to said degating position for axially moving said degating core pin from (1) a first position in which said cylindrical section extends into said closed mold cavity but terminates in spaced relation to said mold surface to define a gating channel connecting said sprue channel with said closed cavity, to (2) a second position in which said cylindrical section extends into said cylindrical portion of said sprue channel and eliminates said gating channel.

5. A mold comprising:

(a) relatively movable die members adapted to define a closed mold cavity, said die members being movable from a molding position to a degating position while defining said cavity;

(b) means defining a sprue channel extending through one of said die members and opening into said cavity at one end thereof;

(c) a degating member movably supported by another of said die members in alignment with said sprue channel and including surface means conforming in cross section to the cross section of said sprue channel; and (d) means responsive to movement of said die members to said degating position for moving said degating member from (1) a first position in which said surface means are disposed in spaced alignment with said sprue channel within said closed cavity beyond a gating channel connecting said sprue channel laterally with said cavity to (2) a second position in which said surface means traverse said gating channel and extend partially into said sprue channel in mating relation therewith.

References Cited

UNITED STATES PATENTS

| | | | |
|---|---|---|---|
| 2,471,148 | 5/1949 | Gale et al. | 18—30 |
| 2,999,273 | 9/1961 | Gronemeyer et al. | 18—30 |

J. SPENCER OVERHOLSER, Primary Examiner

M. O. SUTTON, Assistant Examiner